US008558735B2

(12) United States Patent
Bachmann et al.

(10) Patent No.: US 8,558,735 B2
(45) Date of Patent: Oct. 15, 2013

(54) HIGH-RESOLUTION RADAR MAP FOR MULTI-FUNCTION PHASED ARRAY RADAR

(75) Inventors: Svetlana M. Bachmann, Liverpool, NY (US); Fred Tanjutco, Cherry Hill, NJ (US); Yasser Al-Rashid, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 409 days.

(21) Appl. No.: 12/860,644

(22) Filed: Aug. 20, 2010

(65) Prior Publication Data
US 2012/0044105 A1    Feb. 23, 2012

(51) Int. Cl.
*G01S 7/28*    (2006.01)
*G01S 7/42*    (2006.01)

(52) U.S. Cl.
USPC .............. 342/188; 342/26 R; 342/73; 342/74; 342/81; 342/82; 342/89; 342/175; 342/350; 342/351; 342/361

(58) Field of Classification Search
USPC ........ 342/25 R–25 F, 73, 74, 81, 89, 90, 175, 342/188, 350, 351, 361–366, 26 R–26 D, 59, 342/82, 368–377; 343/700 R, 850, 853
See application file for complete search history.

(56) References Cited

U.S. PATENT DOCUMENTS

| | | | | |
|---|---|---|---|---|
| 4,829,303 A * | 5/1989 | Zebker et al. | ............... | 342/25 A |
| 5,206,655 A * | 4/1993 | Caille et al. | .................. | 342/25 R |
| 5,255,004 A * | 10/1993 | Berkowitz et al. | ............ | 343/853 |
| 5,311,192 A * | 5/1994 | Varga et al. | .................... | 342/188 |
| 5,313,210 A * | 5/1994 | Gail | ............................ | 342/25 A |
| 5,552,787 A * | 9/1996 | Schuler et al. | .............. | 342/25 A |
| 5,659,322 A * | 8/1997 | Caille | ........................... | 342/188 |
| 6,262,681 B1 * | 7/2001 | Persechini | ..................... | 342/188 |
| 6,377,207 B1 * | 4/2002 | Solheim et al. | ............... | 342/351 |
| 6,608,587 B1 * | 8/2003 | Sparrow et al. | ............... | 342/188 |
| 6,750,805 B1 * | 6/2004 | Cameron | ........................ | 342/90 |
| 6,756,935 B1 * | 6/2004 | Cameron et al. | ................ | 342/90 |
| 6,911,937 B1 * | 6/2005 | Sparrow et al. | ............... | 342/188 |
| 7,345,625 B1 * | 3/2008 | Urkowitz | ....................... | 342/188 |
| 7,355,546 B2 * | 4/2008 | Randall | ......................... | 342/188 |
| 7,570,202 B2 * | 8/2009 | Raney | ............................ | 342/188 |
| 7,623,064 B2 * | 11/2009 | Calderbank et al. | .......... | 342/188 |
| 7,825,847 B2 * | 11/2010 | Fujimura | ..................... | 342/25 R |
| 8,072,369 B2 * | 12/2011 | Lackey | ......................... | 342/188 |
| 8,098,189 B1 * | 1/2012 | Woodell et al. | ................ | 342/188 |
| 8,125,370 B1 * | 2/2012 | Rogers et al. | ................. | 342/25 F |

OTHER PUBLICATIONS

National Academies "Evaluation of the Multifunction Phased Array Radar Planning Process, 2008 " http://www.nap.edu/catalog.php?record_id=12438.

(Continued)

*Primary Examiner* — Bernarr Gregory
(74) *Attorney, Agent, or Firm* — Howard IP Law Group, PC

(57) ABSTRACT

A method of operating a multi-function phased array radar system having an antenna array populated with dual-pol antenna elements is described. The method includes selectively controlling individual dipoles of each dual-pol antenna element in order to operate the array in either a polarimetric mode with improved cross-pol isolation, or in a multi-mission mode, wherein a plurality of singularly-polarized signals are produced.

23 Claims, 3 Drawing Sheets

(56) References Cited

OTHER PUBLICATIONS

National Academies "Weather Radar Technology Beyond NEXRAD, 2002" http://www.nap.edu/catalog.php?record_id=10394.

J. F. Hopperstad and S. Holm, "Optimization of sparse arrays by an improved simulated annealing algorithm", Proc. Int. Workshop on Sampling Theory and Applications, pp. 91-95, Loen, Norway, Aug. 1999.

Leeper, D.G., "Isophoric arrays-massively thinned phased arrays withwell-controlled sidelobes" Antennas and Propagation, IEEE Transactions on, 1999, vol. 47, Issue: 12, on pp. 1825-1835, DOI: 10.1109/8.817659.

Quevedo-Teruel O.; Rajo-Iglesias, E. "Ant Colony Optimization in Thinned Array Synthesis With Minimum Sidelobe Level", Antennas and Wireless Propagation Letters, IEEE, vol. 5, Issue 1, Dec. 2006 pp.349-352; DOI: 10.1109/LAWP.2006.880693.

* cited by examiner

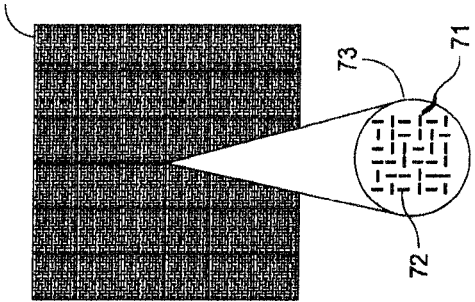
Fig. 5
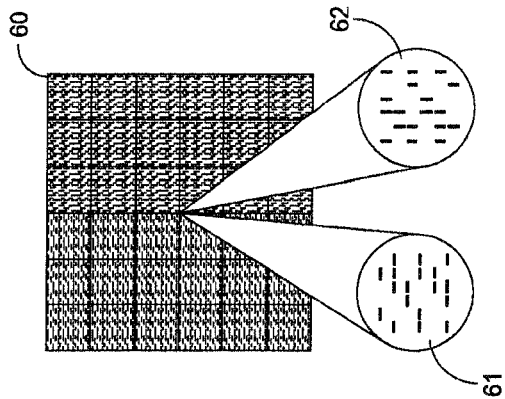
Fig. 6
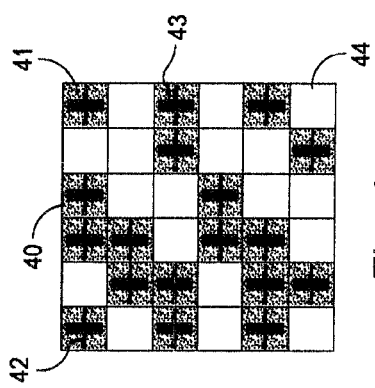
Fig. 4
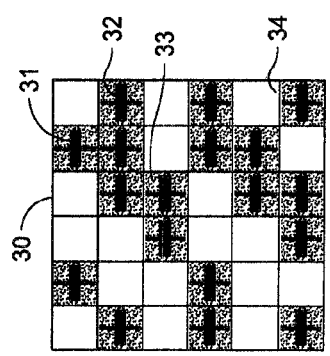
Fig. 3
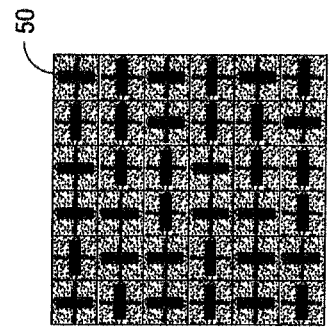
Fig. 7
Fig. 1A
Fig. 1B

HIGH-RESOLUTION RADAR MAP FOR MULTI-FUNCTION PHASED ARRAY RADAR

FIELD OF THE INVENTION

The present invention relates to radar systems, specifically to multi-function phased array radar systems.

BACKGROUND

Radar systems are critical to the operations of various agencies such as the National Oceanic and Atmospheric Administration (NOAA), National Weather Service (NWS), the Federal Aviation Administration (FAA), the Department of Defense (DOD) and the Department of Homeland Security (DHS). These agencies have numerous varying requirements and potential applications for modern radar technology. These applications include weather observation, meteorological research, aircraft tracking, unmanned aircraft systems surveillance and surface transportation. As each of these agencies requires a radar system with unique capabilities, the current radar infrastructure comprises a wide variety of radar types and configurations. For example, weather tracking operations performed by the NOAA and FAA may require a radar system capable of dual-polarization (dual-pol) operation. However, radar tasks associated with the DHS and/or other FAA operations do not have such requirements. Likewise, a narrow beamwidth, for example, no greater than one (1) degree, may be required for certain tracking operations but not for others. These parameters may necessitate variations in antenna array size, radiating element type, cost, and/or complexity.

As many existing radar systems are coming due for replacement, government and industry are working to transition from these individualized systems to a universal system capable of meeting the various agency demands, while offering reduced complexity and substantial cost savings. One proposed solution is digital phased array technology, specifically multi-function phased array radar (MPAR). A phased array antenna is comprised of numerous radiating elements each having a phase shifter. Beams are formed by selectively activating all or a portion of antenna elements of a given array. Scanning or steering of the beams is accomplished by shifting the phase of the signals emitted from the elements in order to provide constructive and/or destructive interference. The ability to form and steer a radar beam permits multiple functions to be performed by the same radar system. In addition to multi-function operation, these arrays have a quicker response time and operate at a higher resolution than existing rotating radar systems.

While MPAR offers advantages over current systems, several technical and economic obstacles need to be overcome before it can be implemented successfully as a universal system. One example of an application creating technical challenges is weather-related radar systems. Particularly, singularly-polarized (single-pol) systems (systems transmitting a signal oriented on one axis, e.g. a horizontal axis) are largely incapable of hydrometeor classification, as rain drops, water droplets, vapor and ice particles each have different geometric shapes and physical properties when falling. Single-pol beams measure precipitation as if it consists of only perfect spheres, and therefore cannot effectively estimate the size of the precipitation, and thus the type and amount thereof.

To overcome this shortcoming, radar systems have been developed which transmit alternating or simultaneous pulses of horizontally and vertically polarized signals using arrays possessing orthogonally oriented radiating antenna elements. These dual-pol radar systems, or "polarimetric" systems, offer several advantages over conventional single-pol radars in estimating precipitation types and amounts. For instance, by measuring along two axes, these systems have the capability of discriminating between hail and rain, estimating rainfall volume and detecting mixed precipitation. Accordingly, most weather radars, such as those operated under NOAA requirements, as well as the FAA to monitor potential plane icing conditions, utilize dual-pol radar arrays.

A number of current dual-pol radar systems transmit sequential pulses of differing polarizations (i.e. a horizontal pulse followed by a vertical pulse). However, these spaced pulses reduce the effective velocity range of the radar, in addition to creating long dwell times. Specifically, in order to correlate the data from both the horizontally polarized and vertically polarized channels in current systems, a single-pol pulse is transmitted followed by a period of delay while reflected signals are received. The orthogonal pulse is subsequently sent and corresponding data is received during a second period of delay time. Therefore, reception of the reflected signals of both polarities occurs over these two delay periods, resulting in an increased overall dwell time. Similarly, because the dwell time is doubled, computational speed is effectively halved.

Other dual-pol radar systems, such as radars in the current NOAA weather radar network, simultaneously transmit the horizontal and vertical signals using, for example, crossed dipole antenna elements, to solve the issues of longer dwell times and velocity range reductions. While reducing these negative effects, these arrangements have problems with interference between the crossed horizontal and vertical signal components. Moreover, units having improved cross-pol isolation are costly, and thus unsuitable for use in the large antenna arrays necessary for meeting the narrow beamwidth requirements of some agencies.

Accordingly, an alternative means to implement dual-pol operation of a MPAR system with improved isolation is required.

SUMMARY

In one embodiment of the present invention, a multi-function phased array radar system and method of operation thereof is provided. The radar system comprises an array populated with either dual-pol antenna elements, or selectively arranged single-pol antenna elements, and a plurality of transmit/receive modules coupled to these antenna elements. If dual-pol elements are used, the modules are controlled by an algorithm for selectively activating either the vertical or horizontal portions of the dual-pol elements such that each element operates in only one of a horizontal and vertical mode at a given time. If single-pol elements are used, the elements are arranged such that approximately half of elements are vertically oriented and the other half of the elements are horizontally oriented. In one embodiment of the present invention, the above-described systems are operative to transmit a single polarimetric radar signal. In another embodiment of the present invention, the above-described systems are operative to simultaneously transmit at least two independent radar signals, for example, one having a horizontal polarization and a second having a vertical polarization.

BRIEF DESCRIPTION OF THE DRAWINGS

FIGS. 1A and 1B are a perspective views of exemplary dual-polarized antenna elements.

FIG. 3 is a perspective view of a virtual thinned antenna array comprising dual-polarized elements operative to transmit only a horizontal signal component.

FIG. 4 is a perspective view of a virtual thinned antenna array comprising dual-polarized elements operative to transmit only a vertical signal component.

FIG. 5 is a perspective view of the two virtual thinned antenna arrays of FIGS. 3 and 4 interweaved to form a fully-populated array.

FIG. 6 is a representative view of an antenna array according to an embodiment of the present invention operating in multi-mission mode.

FIG. 7 is a representative view of an antenna array according to an embodiment of the present invention operating in a polarimetric mode.

DETAILED DESCRIPTION OF PREFERRED EMBODIMENTS

Figure 2:
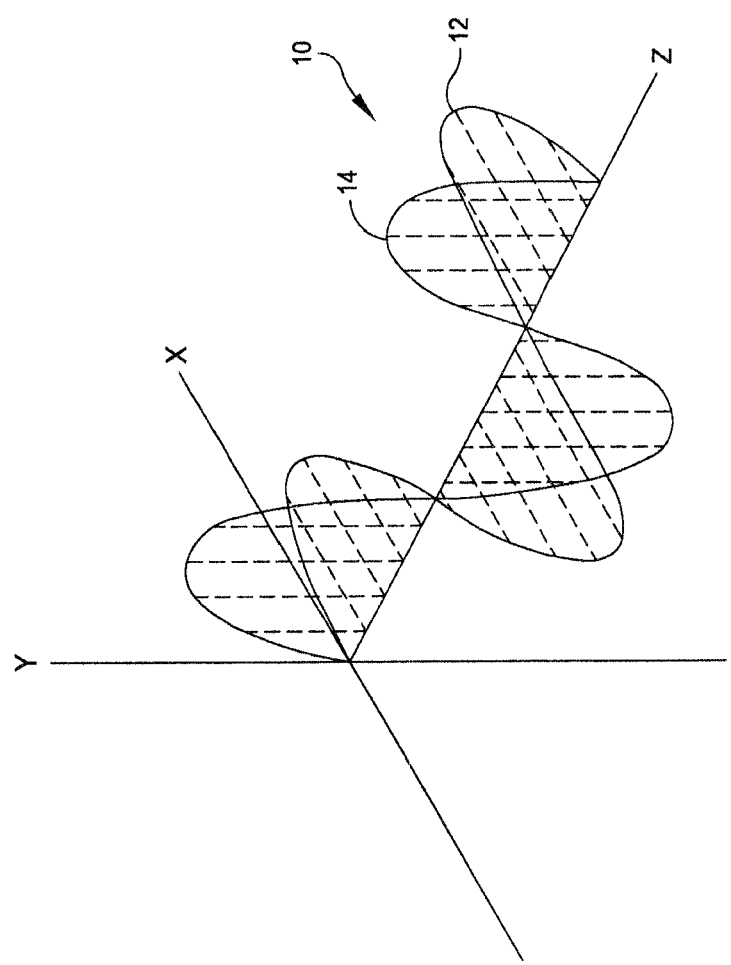
FIG. 2 is a diagram of a dual-polarized radar beam having orthogonal signal components.

It is to be understood that the figures and descriptions of the present invention have been simplified to illustrate elements that are relevant for a clear understanding of the present invention, while eliminating, for purposes of clarity, many other elements found in typical radar systems, such as multi-function, phased array radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIGS. 1A and 1B, dual-pol antenna elements 20,24 are shown. The element 20 consists of two orthogonal planar radiating elements, in particular, crossed dipoles having horizontal dipole element 21 and vertical dipole element 22 (FIG. 1A). The centers of the dipoles 21,22 are co-located and their axes are offset at an angle, in this case, ninety degrees, each emitting a respective polarized signal. Element 24 shown in FIG. 1B, comprises offset center-fed dipoles 21,22. While only two types of elements are shown, it is understood that the radiating elements could comprise any number arrangements including crossed or offset slots, micro-strips, dipoles or a combination of a dipole parallel to a slot.

A dual-pol or polarimetric waveform 10 comprising a horizontal component 12 and a vertical component 14 is shown in FIG. 2. The dual-pol waveform 10 may be produced by, for example, at least one dual-pol antenna element, such as those shown in FIG. 1A or 1B, an array of crossed-dipoles (See FIG. 6), or an array of single-pol elements having both horizontal and vertical polarities. As described above, the simultaneous transmission of these orthogonal signals 12,14 from traditionally operated dual-pol elements results in a reduced ability to isolate each of the respective horizontal and vertical dipole fields.

Cross-polarization isolation is the ratio of the cross-polarized signal component from one transmitted polarization to the cross-polarized signal component for the orthogonal transmitted polarization. This interference is caused by the interaction of the crossing electromagnetic field of each dipole with the field of the other dipole, as well as the surrounding antenna housing. The individual electromagnetic fields surrounding the dipoles transfer energy to each other. This coupling influences the correlation of the two orthogonally polarized signals, thus reducing radar accuracy. Cross-polarization isolation is a primary limiting factor in the performance of dual-polarized radar systems.

This characteristic has led to the development of improved dual-pol antenna elements which possess increased isolation between orthogonal signal components. At present, these elements are extremely expensive however, and thus unfit for use in MPAR systems, wherein a given array may comprise thousands of antenna elements.

FIGS. 3 and 4 show two virtual thinned radar arrays 30,40 accordingly to an embodiment of the present invention. The first thinned array 30 (FIG. 3) comprises dual-pol antenna elements 31 having horizontal and vertical radiating components located within apertures 34. These radiating components may comprise, for example, crossed or offset electric dipoles 32,33 orthogonally with respect to one another. The crossed dipoles 32,33 transmit horizontal and vertical signals along their respective planes and receive respective return signals having like polarities. While an orthogonal (i.e. horizontal and vertical) orientation is described, it should be understood that a range of relative polarization angles can be utilized without departing from the scope of the present invention.

In an embodiment of the present invention, although the antenna elements 31 comprise dual-pol arrangements, in operation, only a single pol is activated at any given time. For example, in FIG. 3, only the horizontal dipoles 32 of the antenna elements 31 are activated (represented in bold). In an exemplary embodiment, the array is thinned approximately 50%, meaning that only one-half of the available apertures 34 comprise antenna elements 31 having their horizontal dipoles 32 activated, wherein the remaining apertures 34 are void. In an alternate embodiment of the present invention, the array 30 may comprise only single-pol elements. For example, the dual-pol elements 31 of FIG. 3 would be replaced with single-pol, horizontally arranged elements.

Referring generally to FIG. 4, the second virtual thinned array 40 comprises the same dual-pol antenna elements 41, having horizontal 42 and vertical 43 crossed dipoles located in selected antenna apertures 44. However, wherein the array 30 shown in FIG. 3 has only the horizontal dipoles 42 activated, the array 40 has only the vertical dipoles 43 activated. In an exemplary embodiment, the array 40 is also thinned approximately 50%, and in a complementary fashion to the thinning provided on the first array 30. Thus, in locations where the first array 30 comprises voids, the second array 40 comprises antenna elements 41 having activated vertical dipoles 43. As indicated above with respect to FIG. 3, while dual-pol elements 41 are shown, it is envisioned that these elements may be replaced with vertically oriented single-pol elements without departing from the scope of the present invention.

The combination or interleaving of these virtual thinned arrays 30,40, or sub-arrays, forms a fully populated array 50 (FIG. 5). Specifically, in the illustrated embodiment, all of the array's apertures 54 are filled with the dual-pol elements 51. As described above with respect to FIGS. 3 and 4, generally 50% of the elements 51 of the array 50 operate with only their horizontal dipoles 52 activated, and the remaining 50% of the array elements 51 operate with only their vertical dipoles 53 activated (represented in bold). As noted above, the array 50 may also comprise approximately 50% horizontally arranged single-pol elements, and 50% vertically arranged single-pol elements. In either embodiment, the array 50 is operative to transmit signal components having both horizontal and vertical polarities simultaneously, such as the polarimetric signal shown in FIG. 2. However, as individual dual-pol elements 51 are not operating both the horizontal 52 and vertical pols 53 simultaneously, isolation between the generated orthogonal signal components is greatly improved. Particularly, interaction of the electromagnetic fields of each dipole 52 with the fields of the other crossed dipole 53 is eliminated, as no two crossed dipoles 52,53 are activated at a given time. The result is a system which exhibits exceptionally good-cross polarization isolation characteristics, while remaining useful for the classification of weather (vapor, gas, water states and contents by shape and scattering properties).

Notably, the array 50 is able to achieve sufficient isolation during dual-pol operation without resorting to costly antenna elements, or the sequential transmission of horizontal and vertical antenna pulses. As noted above, narrow beamwidth requirements necessitate the use of very large antennas arrays, with a corresponding increase in the number of antenna elements required to populate the large arrays. Thus, the ability to use more economical antenna elements is vital to controlling overall system cost.

The virtual thinning or selective control of the dual-pol elements 51 can be achieved by utilizing various thinning algorithms. In an array comprising single-pol elements, the thinning algorithms may determine the desired arrangement and orientation of the single-pol elements in the array. In particular, a thinning algorithm may be applied to determine locations on the array which are populated with the horizontally oriented single-pol element, and the remaining portion of the array is populated with the vertically oriented single-pol elements. In the case of an array populated with dual-pol elements, the thinning algorithms may be used to selectively determine which dipole is activated for a given antenna element.

Digital beamforming algorithms may be used to create one or more beams of a desired size and orientation from each thinned portion of the array. Moreover, as is known in the art, these algorithms may also be used to control, for example, beam side lobe in addition to many other characteristics. In order to effectively operate the radar array 50 of the present invention, these algorithms control the activation of particular antenna elements 51 for the formation of desired beams, from one of the two thinned subsets of elements.

For example, a suitable algorithm is capable of virtually thinning the array 50 by selectively activating only the horizontal dipoles 53 of predetermined antenna elements 51, and activating only the vertical dipoles 53 of a portion of the remaining elements. In one embodiment, these control algorithms may operate to activate transmit/receive modules which in turn control the operation the antenna elements 51 in either a transmit mode, or a receive mode wherein like-polarized return signals are received and processed.

As shown in FIGS. 6 and 7, these thinning and control operations allow the array 50 to be operated in various modes. For example, in a first mode, as described above, the antenna array 70 is operative to produce a single, dual-polarized signal 73 comprised of horizontal and vertical components 71,72, such as that required for weather related uses (See FIG. 6).

Further, the arrangement also allows for the transmission of two distinct signals. Specifically, the thinning and control algorithms may be used to form a beam or beams by activating only the horizontal dipoles 61 of a portion of the antenna elements (See FIG. 7). Another beam forming algorithm may be applied to a portion of the remaining antenna elements of the array 60, activating only the vertical dipoles 62. These separate, non-polarimetric beams can be operated simultaneously and independently. Thus, the array 60 can be used for multi-mission operations, for example, multiple-target tracking, surveillance, and air-traffic-control. The radar system may also be implemented so as to produce both a polarimetric signal as well as singularly-polarized signals simultaneously, accordingly to a particular implementation of a control algorithm, thereby further enhancing the multi-mission capability of the system. In addition to these described modes, it is envisioned that the combination of digital beam forming, with selective individual dipole, phase, and magnitude control may be used to create any number of different beam arrangements useful for a variety of purposes.

Figure 8:
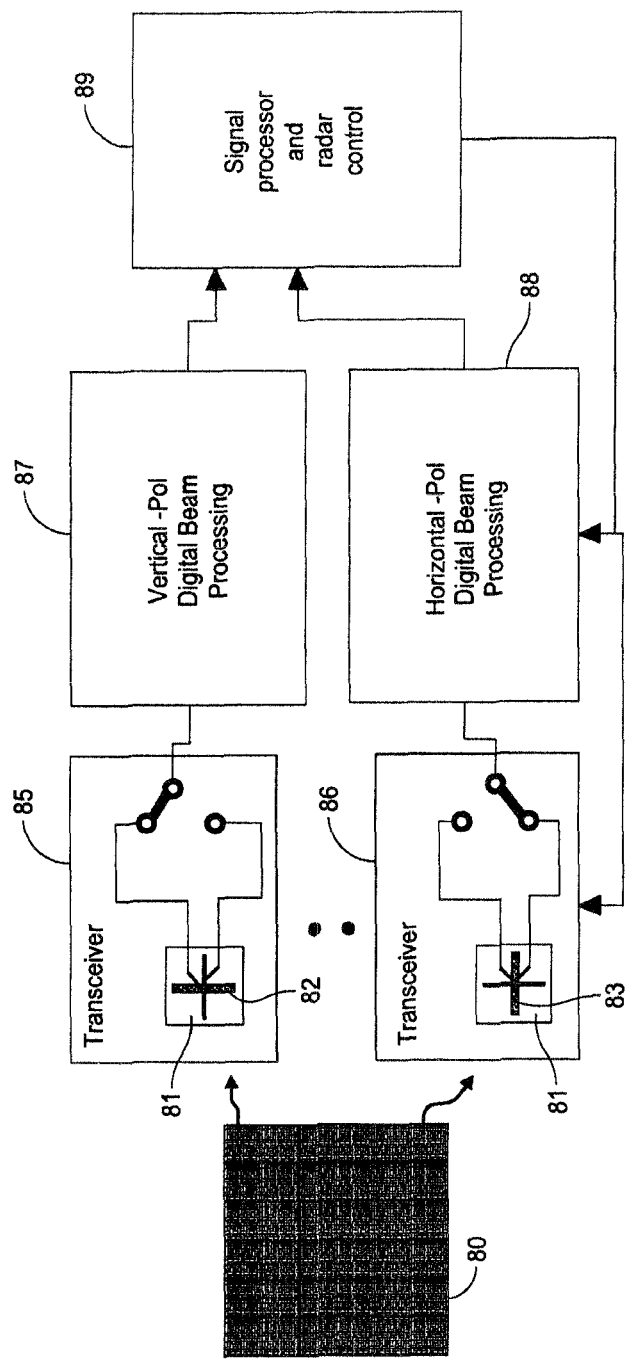
FIG. 8 is a block diagram describing the operation of a radar system according to an embodiment of the present invention.

Referring generally to FIG. 8, a simplified diagram of an exemplary radar system according to an embodiment of the present invention is shown. An antenna array 80 is provided, such as an array of dual-pol antenna elements as described above with respect to FIG. 5. In an exemplary embodiment, a first transceiver 85 is provided for the selective control of the vertical dipole elements 82 of the array 80. The transceiver 85 is operative to switch the elements 82 between a transmit and a receive mode. Similarly, a second transceiver 86 is coupled to the horizontal dipole elements 83 and is also operative to switch between a transmitting and a receiving mode. In alternative embodiments of the present invention, it is envisioned that any number of transceivers, or other suitable switching arrangements may be utilized for individual control of the horizontal and vertical dipole elements.

Beamformers 87,88 are operatively connected to respective transceivers 85,86. The beamformers 87,88, in a transmit mode, operate to selectively excite the vertical and horizontal antenna elements so as to form a desired beam pattern. As described above with respect to FIGS. 6 and 7, these patterns may consist of one or more single-pol beams, or one or more dual-pol beams, and alter their respective phases to provide the above-described directional control. A signal processor/radar control device 89 is operative to communicate control signals to the respective beamformers, controlling the operation of the radar system.

In a receive mode, reflected return signals are received by the array 80. Horizontal and vertical dipole elements 82,83 are responsive to these return signals and provide a representative analog return signal to the beamformers 87,88. The beamformers 87,88 are operative to combine the received return signals to form one or more beams. Each beam is the result of a combination of the output signals of the antenna elements 82,83, and are arranged according to the direction of the received signals, while signals arriving from other directions are de-emphasized. In this way, the beamformers operate as a type of special filter to separate the return signal from unwanted noise and interference. Respective horizontal and vertical beamformed return signals are supplied to the signal processor 89 for further filtering and/or analysis.

While the foregoing describes exemplary embodiments and implementations, it will be apparent to those skilled in the art that various modifications and variations can be made to the present invention without departing from the spirit and scope of the invention.

The invention claimed is:

1. A polarimetric radar system comprising:
   an array comprising a plurality of antenna elements, a portion of the antenna elements defining a first sub-array operative to transmit a radar signal component having a first polarization, and a remaining portion of the antenna elements defining a second sub-array, interleaved with the antenna elements of the first sub-array, and operative to transmit a radar signal component having a second polarization, and
   a control module for selectively controlling of each of the antenna elements of the first and second sub-arrays.

2. The system of claim 1, wherein the first and second signal polarizations are oriented generally orthogonally to one another.

3. The system of claim 2, wherein the control module is operative in a first mode to generate a polarimetric radar signal having orthogonally arranged signal components.

4. The system of claim 1, wherein the plurality of antenna elements comprise a plurality of dual-polarized antenna elements.

5. The system of claim 4, wherein each dual-polarized antenna element comprises a first emitting element arranged generally orthogonally with respect to a second emitting element.

6. The system of claim 5, wherein the control module is operative to independently control one of the first or second emitting elements of each antenna element.

7. The system of claim 1, wherein the plurality of antenna elements comprise a plurality of single-polarized elements.

8. The system of claim 7, wherein the single-polarized antenna elements defining the first sub-array comprise emitting elements arranged generally orthogonally relative to emitting elements of the antenna elements defining the second sub-array.

9. The system of claim 1, wherein the control module is operative to generate and control first and second radar beams independently of one another.

10. The system of claim 9, wherein the first and second radar beams are operated simultaneously.

11. The system of claim 9, wherein the first radar beam is formed according to a first beam forming algorithm, and the second radar beam is formed according to a second different beam forming algorithm.

12. The system of claim 9, wherein the first radar beam comprises a phase and magnitude distinct from a phase and magnitude of the second radar beam.

13. A multi-function phased array radar system comprising:
   an antenna array comprising a plurality of dual-polarized antenna elements, each of the dual-polarized antenna elements comprising a first emitter and a second emitter arranged generally orthogonally with respect to one another, and
   a controller in selective communication with the first emitter and the second emitter of each antenna element such that for each antenna element, the first emitter can be excited independently of the second emitter, and the second emitter can be excited independently of the first emitter.

14. The radar system of claim 13, wherein the controller is operative to generate a polarimetric radar beam by exciting only the first emitters of a portion of the antenna elements, and only the second emitters of another portion of the antenna elements.

15. The radar system of claim 13, wherein the controller is operative to create a first beam and a second beam, the first and second beams being independently controlled.

16. A method of operating a radar array antenna, the method comprising the steps of:
   providing a radar array comprising a plurality of dual-polarized antenna elements, each antenna element comprising a first radiating element and second radiating element,
   generating a first radar signal component from a first sub-array comprising a portion of the dual-polarized antenna elements by selectively exciting the first radiating elements, and
   simultaneously generating a second radar signal component with the first radar signal component from a second sub-array comprising a remaining portion of the dual-polarized antenna elements by selectively exciting the second radiating elements,
   wherein only one of the first and second radiating elements of a given antenna element is excited at a given time.

17. The method of claim 16, wherein the first and second radiating elements are arranged generally orthogonally.

18. The method of claim 17, wherein the first and second radiating elements comprise a pair of crossed dipoles.

19. The method of claim 16, further comprising the step of operating the radar array in a first mode, wherein the step of generating a first and a second radar signal component comprises generating at least one polarimetric radar signal comprising generally orthogonal signal components.

20. The method of claim 16, wherein the first and second radar signal components are controllably operated to define first and second radar beams independently of one another.

21. The method of claim 20, wherein the first and second radar beams are operated simultaneously.

22. The method of claim 20, wherein the first radar beam is formed according to a first beam forming algorithm, and the second radar beam is formed according to a second different beam forming algorithm.

23. The method of claim 20, wherein the first radar beam comprises a phase and magnitude distinct from a phase and magnitude of the second radar beam.

* * * * *